United States Patent
Honjo et al.

[15] 3,666,748
[45] May 30, 1972

[54] METHOD FOR PRODUCTION OF CYTIDINE (OR DEOXYCYTIDINE)-5'-DIPHOSPHATE CHOLINE AND INTERMEDIATES THEREFOR

[72] Inventors: Mikio Honjo, Takatsuki; Yoshiyasu Furukawa, Suita, both of Japan

[73] Assignee: Takeda Chemical Industries, Ltd., Higashi-ku, Osaka, Japan

[22] Filed: Dec. 17, 1968

[21] Appl. No.: 784,494

[30] Foreign Application Priority Data

Dec. 18, 1967 Japan....................................42/81074
Mar. 5, 1968 Japan....................................43/14166

[52] U.S. Cl..................260/211.5 R, 260/247.5 R, 260/252, 260/290 R, 260/309.7, 260/945, 424/180, 424/198, 424/200
[51] Int. Cl. ........................................................G07d 51/52
[58] Field of Search..............................260/211.5, 211.5 R

[56] References Cited

FOREIGN PATENTS OR APPLICATIONS 6,541  5/1964  Japan...................................260/211.5
1,384  1/1967  Japan...................................260/211.5

Primary Examiner—Lewis Gotts
Assistant Examiner—Johnnie R. Brown
Attorney—Wenderoth, Lind & Ponack

[57] ABSTRACT

Cytidine-5'-diphosphate choline and deoxycytidine-5'-diphosphate choline are produced by reacting cytidine (or deoxycytidine)-5'-monophosphate with a choline phosphoramidate. Choline phosphoramidates of the formula

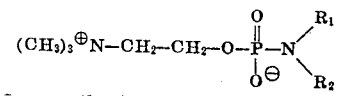

wherein $R_1$ and $R_2$ represent hydrogen, a hydrocarbon residue having at most 7 carbon atoms, or $R_1$ and $R_2$ taken together represent a five- of six-membered heterocyclic ring are prepared by reacting phosphorylcholine with an amine.

3 Claims, No Drawings

METHOD FOR PRODUCTION OF CYTIDINE (OR DEOXYCYTIDINE)-5'-DIPHOSPHATE CHOLINE AND INTERMEDIATES THEREFOR

This invention relates to a novel and industrially useful method for the production of cytidine-5'-diphosphate choline or deoxycytidine-5'-diphosphate choline.

Hereinafter, "cytidine-5'-diphosphate choline" and "deoxycytidine-5'-diphosphate choline" are abbreviated as "CDP-choline" and "dCDP-choline," respectively.

As the industrially applicable method for the production of CDP-choline and dCDP-choline, there has been previously known a method where a cytidine (or deoxycytidine)-5'-phosphoramidate is reacted with phosphorylcholine (cf. Japanese Patent Publication No. 1384/1967). However, according to this known method, the yield of the objective compound is as low as about 50 percent.

It has been found by the present inventors that phosphorylcholine (I) can be converted to its amidate (III) and that the reaction of these novel choline phosphoramidates (III) with cytidine-5'-monophosphate (CMP) or deoxycytidine-5'-monophosphate (dCMP) yields the desired CDP-choline (IVa) or dCDP-choline (IVb) at a surprisingly elevated yield of as high as 90 percent or in substantially quantitative yields.

The principal object of the present invention is therefore to provide a method for the production of CDP-choline or dCDP-choline with a good yield.

Another object is to provide a group of novel choline phosphoramidates which are useful as the intermediates for the improved production of valuable CDP-choline and its analogs.

The essential part of said newly discovered reactions is explanatorily shown in the following reaction scheme:

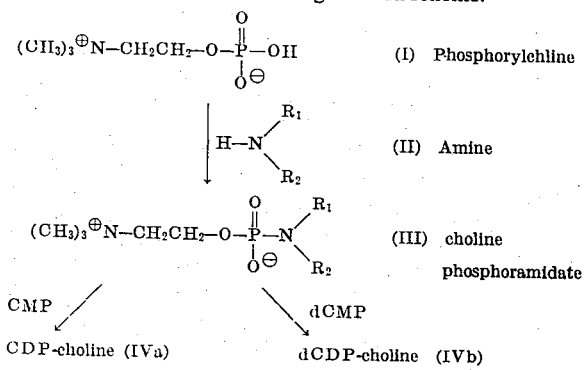

In the formulas, each of $R_1$ and $R_2$ is hydrogen, a hydrocarbon residue having at most seven carbon atoms, e.g., alkyl, alkenyl, phenyl, benzyl, etc., or $R_1$ and $R_2$, taken together with the adjacent nitrogen atom represent a five- or six-membered heterocyclic ring which may contain one or more additional hetero atoms, e.g., oxygen.

The amines (II) include, for example, ammonia, methylamine, diethylamine, dibenzylamine, morpholine, imidazole, and 2-methylimidazole.

The principal object of the present invention is realized by reacting CMP or dCMP with choline phosphoramidate (III).

CMP and dCMP is commercially available and may be prepared, for example, after the manner described in U.S. Pat. No. 3,168,446, United Kingdom Pat. Nos. 912,790 and 928,776. (e.g., triethylamine, pyridine), CMP or dCMP may be submitted to the reaction of the present invention in a free form or a form of sald of CMP or dCMP with a base, which includes, for example, an organic amine (e.g., diethylamine, triethylamine, tributylamine, tri-n-octyl-amine, dicyclohexylguanidine, pyridine), ammonia and metal (e.g., sodium, potassium, calcium, magnesium). Among those forms of CMP or dCMP, the organic amine salt is most advantageously employed in view of the solubility in the reaction system as well as the resulting yield.

The novel choline phosphoramidate (III) to be employed in the method of the present invention is produced, for example, by reacting phosphorylcholine (I) or its halide (e.g., chloride or bromide) with an amine (II) in the presence of dicyclohexylcarbodiimide (abbreviated as "DCC").

The above reaction is preferably carried out in a solvent such as hydrous t-butanol, hydrous formamide, hydrous pyridine. The reaction proceeds almost quantitatively under heating.

Thus produced choline phosphoramidate (III) is usually obtained in a form of a guanidinium salt, the guanidinium moiety of which has concomitantly been produced by the reaction between DCC and the amine used. Such salts themselves are conveniently employed for further reaction in the method of the present invention.

However, before submitted to the further reaction, such salt may be liberated into the free form or may be transformed into other salt, and the liberation or the transformation can be effected according to a per se conventional manner.

The reaction of CMP or dCMP with the choline phosphoramidate (III) is generally carried out in the presence of a solvent such as ortho-chlorophenol, meta-cresol, acetonitrile, pyridine and the like. The reaction temperature generally ranges from about 60° C to about 100° C.

Thus produced CDP-choline or dCDP-choline is easily recovered by a per se known manner. For example, the resulting reaction mixture is extracted with water, and the water extract is passed through a column packed with activated carbon, and then eluted with an aqueous solution of ammonia, and the eluate is concentrated to dryness, and the objective compound recovered.

The method of the present invention is useful because it produces CDP-choline or dCDP-choline in a yield as high as 95 percent. Moreover, the method of the present invention is advantageous over known methods, because both of the starting materials of the present invention are easy to handle due to their crystalline forms, while the starting material to be employed in the previously known methods is amorphous and hygroscopic.

For further explanation of the present invention, the following examples are given, wherein the relation between part(s) by weight and part(s) by volume corresponds to that between gram(s) and milliliter(s).

EXAMPLE 1

2.2 parts by weight of phosphorylcholine chloride is dissolved in 100 parts by volume of water, followed by the addition of 3.4 parts by volume of morpholine AND 100 parts by volume of t-butanol. This solution is boiled and a solution of 8.2 parts by weight of dicyclohexyl carbodiimide in 100 parts by volume of t-butanol is gradually added to the boiling solution over about 3 hours. The reaction mixture is further boiled for 3 hours. After cooling, the resulting crystals are removed by filtration. The filtrate is concentrated under reduced pressure to leave an aqueous layer. The residual layer is washed with 100 parts by volume of ether and then with 50 parts by volume of ether, and again concentrated under reduced pressure to dryness. The viscous residue is dissolved in 50 parts by volume of ethanol and the solution is concentrated to dryness to give 5.8 parts by weight of white crystals of 4-morpholino-N,N'-dicyclohexylcarboxamidine chloride salt of choline phosphormorpholidate. This salt is positive to Beilstein's color reaction and shows a single spot being positive to Dragendorff's color reaction and shifting to the cathode in a paper electrophoresis employing 0.05 M borate buffer solution of pH 9.2.

Elementary analysis: $C_9H_{21}N_2O_4P \cdot C_{17}H_{31}N_3O \cdot HCl$
Calculated: C: 53.55, H: 9.16, N: 11.95, P: 5.32
Found: C: 52.83, H: 9.72, N: 11.56, P: 5.42

A solution of 2.52 parts by weight of the above produced salt and 3.05 parts by weight of CMP mono(tri-n-butylamine) salt in 160 parts by volume of ortho-chlorophenol is heated at 100° C for 18 hours. After cooling, 400 parts by volume of ether is added to the solution. The resulting mixture is extracted two times with each of 300 parts by volume of ether.

The aqueous layers are combined and washed with 300 parts by volume of ether. The ether is distilled from the aqueous layer and the aqueous layer is allowed to pass through a column packed with 20 parts by weight of activated charcoal. The column is washed with water and eluted with 500 parts by volume of 50 percent ethanol containing 1.4 percent ammonia. The eluate is concentrated to dryness under reduced pressure to give 2.98 parts by weight of colorless powder of CDP-choline monoammonium salt. Yield 95 percent.

EXAMPLE 2

A solution of 2.52 parts by weight of the salt prepared in a similar manner in Example 1 and 3.0 parts by weight of dCMP mono(tri-n-butylamine) salt in 160 parts by volume of ortho-chlorophenol is heated at 100° C for 18 hours. Then the resulting reaction mixture is treated in the same manner as Example 1 to give 2.5 parts by weight of colorless powder of dCDP-choline mono-ammonium salt. Yield 85 percent.

EXAMPLE 3

2.2 parts by weight of phosphorylcholine chloride is dissolved in 25 parts by volume of a 2N aqueous ammonia solution, followed by the addition of a solution of 17 parts by volume of formamide and 10 parts by weight of dicyclohexyl-carbodiimide in 70 parts by volume of t-butanol. The reaction mixture is kept at 80° C in a sealed tube for 10 hours. The resulting precipitates are filtered off, and the filtrate is concentrated under reduced pressure to leave a formamide solution. The residual solution is washed with 40 parts by volume each of ether. From this solution the solvent is distilled off, and the residue is scrubbed with acetone to give 4.7 parts by weight of colorless powder of dicyclohexylguanidinium chloride salt of choline phosphoramidate.

This salt is subjected to the reaction with CMP in a similar manner in Example 1 to give CDP-choline.

EXAMPLE 4

To a solution of 2.2 parts by weight of phosphorylcholine chloride in 100 parts by volume of water, there are added 3.3 parts by weight of 2-methylimidazole and 100 parts by volume of t-butanol. A solution of 8.2 parts by volume of DCC in 100 parts by volume of t-butanol is added dropwise to the above mixture over 3 hours while the mixture is being boiled. After the addition, the boiling is further continued for 3 hours, and the resulting mixture is treated in a similar manner as in Example 3 to give 5.7 parts by weight of colorless powder of 1-(2-methylimidazolyl)-N,N-dicyclohexylcarboxamidine chloride salt of choline phosphor- 2-methylimidazolidate.

The salt is subjected to the reaction with CMP in a similar manner as in Example 1 to give CDP-choline.

EXAMPLE 5

2.2 parts by weight of phosphorylcholine chloride is dissolved in 25 parts by volume of a 6 percent aqueous solution of methylamine, followed by the addition of a solution of 17 parts by volume of formamide and 10 parts by weight of DCC in 70 parts by volume of t-butanol. This mixture is kept at 80° C in a sealed vessel for 10 hours, and is treated in the same way as in Example 2 to give 4.7 parts by weight of colorless powder of N-methyl-dicyclohexylguanidine chloride salt of choline phosphormethylamidate.

This salt is subjected to reaction with CMP in a similar manner as in Example 1 to give CDP-choline.

The CDP-choline and dCDP-choline products of the present invention are useful in the treatment of the disturbance of consciousness accompanying head injuries and cerebral operations. CDP-choline is highly effective for alleviating or restoring neuro-psychiatric symptoms which occur as post-traumatic or post-operative sequelae. Generally, the materials are administered in dosages of from 100–500 mg once or twice a day by intravenous drip, intravenous injections or intramuscular injection. A dose of 250–500 mg is found to be most effective.

What is claimed is:

1. A method for production of cytidine- 5'-diphosphate choline and deoxycytidine- 5'-diphosphate choline which comprises reacting the corresponding cytidine or deoxy-cytidine-5'-monophosphate with a choline phosphoramidate, said reaction being carried out in a solvent and with the aid of heat.

2. The method according to claim 1, wherein the cytidine- or deoxycytidine- 5'-monophosphate is in the form of an organic amine salt, said amine being selected from the group consisting of diethylamine, triethylamine, tributylamine, tri-n-octylamine, dicyclohexylguanidine and pyridine.

3. The method according to claim 1, wherein the amidate is of the formula

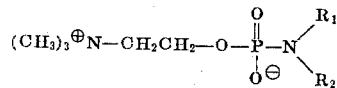

wherein each of $R_1$ and $R_2$ represents hydrogen, a hydrocarbon residue having at most 7 carbon atoms, or $R_1$ and $R_2$, taken together with the adjacent nitrogen atom represent a five- or six-membered heterocyclic ring.

* * * * *